United States Patent [19]

Loy et al.

[11] Patent Number: 4,721,374
[45] Date of Patent: Jan. 26, 1988

[54] COMBINED NIGHT/DAY VIEWING APPARATUS HAVING A LARGE FIELD

[75] Inventors: Fernand R. Loy, Sceaux; Jean-Luc Espie, Chatenay Malabry, both of France

[73] Assignee: U.S. Philips Corporation, New York, N.Y.

[21] Appl. No.: 829,575

[22] Filed: Feb. 14, 1986

[30] Foreign Application Priority Data

Feb. 22, 1985 [FR] France .................... 85 02576

[51] Int. Cl.[4] .................. G02B 23/08; G02B 23/10; G02B 23/12; G02B 23/16
[52] U.S. Cl. .................. 350/538; 350/169; 350/541
[58] Field of Search ............ 350/169, 171, 273, 486, 350/538, 540–544, 557–558, 569, 571

[56] References Cited

U.S. PATENT DOCUMENTS

| | | | |
|---|---|---|---|
| 3,407,302 | 10/1968 | Bouwers | 350/541 |
| 3,456,999 | 7/1969 | Hopp | 350/540 |
| 4,000,419 | 12/1976 | Crost et al. | 350/538 |
| 4,145,119 | 3/1979 | Tausch | 350/587 |
| 4,573,773 | 3/1986 | Arndt et al. | 350/569 |

FOREIGN PATENT DOCUMENTS

| | | | |
|---|---|---|---|
| 111616 | 6/1984 | Japan | 350/171 |
| 2090012 | 6/1982 | United Kingdom | 250/213 VT |
| 2143964 | 2/1985 | United Kingdom | 350/540 |

Primary Examiner—William H. Punter
Attorney, Agent, or Firm—F. Brice Faller

[57] ABSTRACT

The apparatus contained in a single housing (1) comprises a first movable input reflector (4) and a second input reflector (5) for causing the input light beams to deviate along the optical axis (11) of the night path and optical axis (7) of the day path, respectively. The night path is constituted by an objective (12), a light intensifier tube (13) and a bent ocular (14) and the day path is constituted by an optical system having a second output reflector (9). The optical axes of the night path and of the day path extend in a sagittal plane (7, 11) of the carrying vehicle; on the other hand, the first input reflector and the second output reflector are alternately concealable by manipulation of the second output reflector. For viewing by night the first input reflector in the active position is situated before the second input reflector, the second output reflector being in the concealed position. For viewing by day the second output reflector in the active position is situated behind the bent ocular, the first input reflector being in the concealed position.

8 Claims, 5 Drawing Figures

COMBINED NIGHT/DAY VIEWING APPARATUS HAVING A LARGE FIELD

BACKGROUND OF THE INVENTION

The invention relates to a combined night/day viewing apparatus for armoured vehicles. A single housing contains a first movable input reflector and a second input reflector for causing the input light beams originating from the field of view to deviate in the direction of the optical axis of the night path and of the day path, respectively. The night path is constituted by an objective, a light intensifier tube and a bent ocular and the day path is constituted by an optical system having an enlargement 1 (no magnification) and comprising at least one second output reflector.

The viewing apparatus according to the invention is such that the enlargement is equal to 1 for the day path and is of the order of 1 for the night path. For both paths, attempts are made to obtain the largest possible field of view. Through this kind of apparatus, which is mounted so as to traverse the armouring of a vehicle, the viewing is periscopic. The invention is used especially for an episcope intended for driving a tank.

French Utility Models Nos. 2,377,647 and 2,377,648 disclose a night and day viewing apparatus, that is to say an optical periscopic apparatus contained in a single housing that can operate for all the degress of illumination of the objective observed both with a bright sky and with a clouded sky by night. When such an apparatus is mounted in an armoured vehicle, it can consist of a hermetic assembly that can be received by the standardized opening provided until now, which can receive both night viewing apparatus and day viewing apparatus. These technical characteristics and these functions are also examined at the beginning for the viewing apparatus described below. It is in fact very disadvantageous in both cases to use immovable and distinct optical apparatus for viewing by night and by day especially because of the necessity on the one hand to proceed to switching operations, during which viewing through the optical apparatus is no longer possible, and on the other hand to have to arrange the apparatus not utilized without risk of damage of the latter or congestion of the dwelling-place of the vehicle, which is tiny.

The compact construction in a single housing of standarized dimensions can be comparatively readily obtained in a viewing apparatus for which the fields of view are narrow, i.e. of the order of 5° to 10°, and for which the enlargements obtained are substantial, i.e. of the order of 5 to 10, the vehicle provided with the viewing apparatus being normally stationary during viewing. On the contrary, viewing especially for driving a vehicle has to be effected with normal vision, i.e. for a small enlargement equal or substantially equal to 1, which leads to a large field of view. A largest possible field of view is desired and it has to be ensured that the compact construction obtained due to the fact that a night viewing apparatus and a day viewing apparatus are combined in a single housing is not accompanied by a reduction of the field of view.

SUMMARY OF THE INVENTION

The invention has for its object to provide a combined night/day viewing apparatus having a large field and a binocular vision contained in a single housing that can be received by a smallest possible opening through the armouring of the carrying vehicle.

The invention further has for its object to provide the adaptations necessary for the combination in a single housing of a night viewing apparatus and a day viewing apparatus.

The invention still further has for its object to render it possible to enlarge the field in the bearing position for viewing by night in that the night path is made movable inside the said single housing.

Another object of the invention is to render it possible to position in the said apparatus a visualization device for driving the armoured vehicle, which is common to the night and the day paths.

The optical axes of the day path and of the night path extend in the same plane parallel to a longitudinal axis of the armoured vehicle. The first input reflector and the second output reflector are concealable alternately by manipulation of the second output reflector, which comprises second concealing means such that for viewing by night the first input reflector is situated in the active position before the said second input reflector, the second output reflector being in the concealed position. For viewing by day the second output reflector is situated in the active position behind the bent ocular, the first input reflector being in the concealed position.

Preferably, the optical axes of the day path and of the night path are inclined with respect to each other upwards at a small angle, which is made possible due to the fact that the objective of the night path has a smaller diameter than the subjacent light intensifier tube, which reduces the size of the viewing apparatus especially in upward direction at the area at which the apparatus has to traverse the armouring.

When the night path is made operative, light beams are produced from the light intensifier tube, which light beams are reflected especially on the observer's face. Due to the combination in the same housing of the night and day viewing systems, these reflected light beams can traverse at least in part the day viewing system from the interior to the exterior of the armoured vehicle, which would indicate the presence of the armoured vehicle to a hostile observer. For this reason, the combined night/day viewing apparatus according to the invention may include automatic means for making operative the light intensifier tube and automatic obturation means of the day path consisting of a tight shutter hinged on the housing and pulled out of the path of the light beams by a spring when the second output reflector is in the active position. The shutter is at right angles to the optical axis of the day path in the path of the light beam when the second output reflector is in the concealed position.

Since two input reflectors are arranged behind each other, among which the reflector of the night path of reduced dimensions situated in the foremost position is concealable, it becomes possible for the night path provided with the first input reflector to be maneuvered by a rotary movement about its optical axis limited to a few tens of degrees on either side of a medium front position, and for this purpose it is rotatably arranged in the body and comprises a maneuvering lever.

Another advantageous feature of the optical part consists in the presence of the second output reflector in the active position behind the bent ocular of the night path. The bent ocular and the second output reflector each may include a prism having semi-reflecting surfaces and the apparatus may include a device for visualizing orders of driving the armoured vehicle, which is integral with the binocular and is common to the night and day paths. The device is constituted by an assembly of light-emitting diodes defining the symbols of driving orders, the assembly being situated in a plane conjugate with the focal plane of the ocular. The injection into the field of the ocular is realized by means of a prism glued to the semi-reflecting surface of the return prism of the binocular and by means of a prism of triangular cross-section glued to the semi-reflecting surface of the prism constituting the second output reflector.

FIG. 1 is a lateral sectional elevation of the housing and of the optical part of the viewing apparatus;

FIGS. 2a and 2b show diagrammatically in a lateral sectional elevation and in a rear view, respectively, the housing cut away, the apparatus in the position of viewing by day, FIGS. 3a and 3b show in the same respective elevations as in FIGS. 2a and 2b the apparatus in the position of viewing by night.

In the various Figures, the same reference symbols designate the same elements with the same functions.

DETAILED DESCRIPTION OF THE PREFERRED EMBODIMENTS

Figure 1:
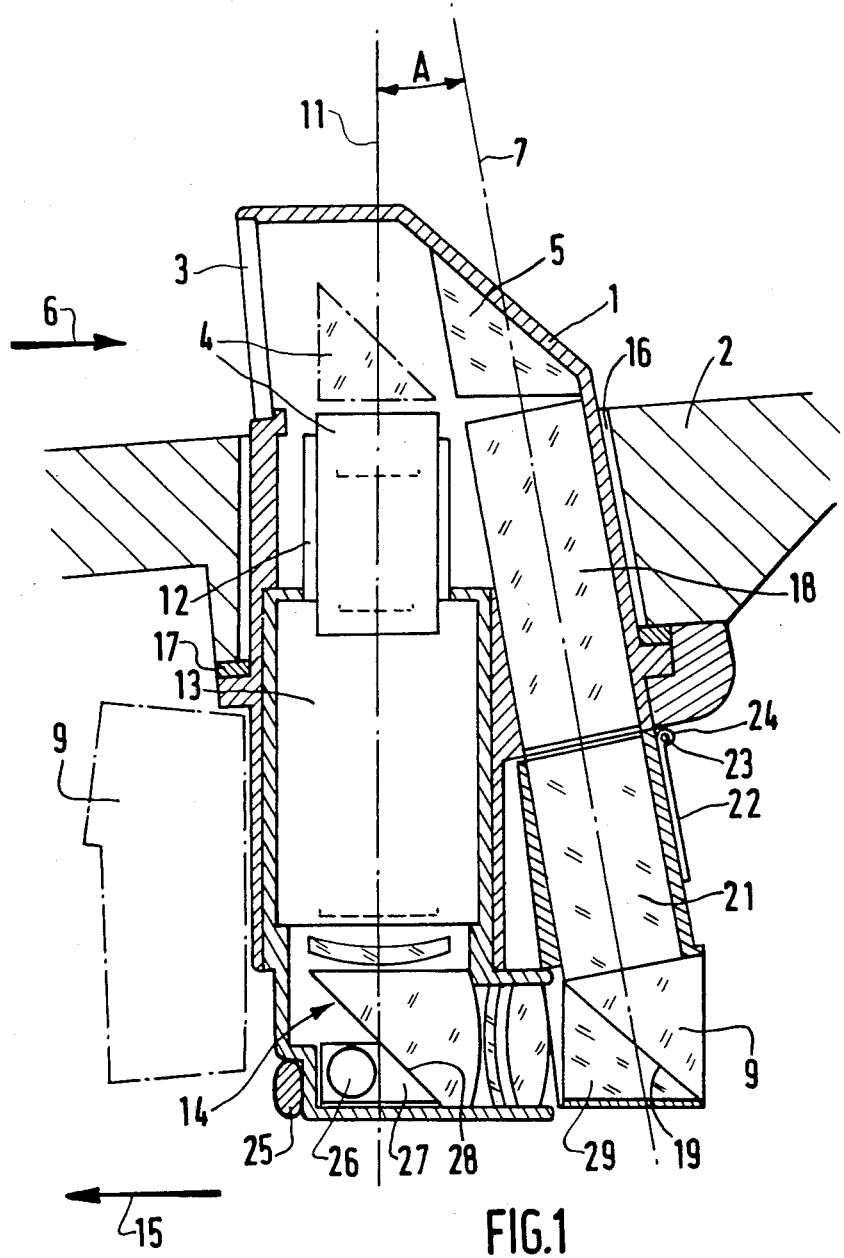

The viewing apparatus shown in FIG. 1 comprises a housing 1 arranged to traverse the wall 2 of an armoured vehicle in such a manner that the upper part closed by an observation glass 3 of the apparatus projects beyond the outer side of the armouring 2. The upper part comprises two input reflectors arranged behind each other. The first input reflector 4 used for viewing by night is movable so that it can occupy two stable positions; in FIG. 1, it is indicated by full lines in the concealed position and by dot-and-dash lines in the active position. The second input reflector 5 used for viewing by day is fixedly secured on the housing behind the upper part. The reflectors 4 and 5 serve to deviate the input light beams originating from the field of view and symbolically indicated by an arrow 6 in two directions both substantially at right angles to the armoured wall 2. Preferably, the reflectors 4 and 5 are total-reflection prisms of triangular cross-section, but mirrors may also be used. In the position of viewing by day, the light beams are directed after reflection on the reflector 5 along an optical axis 7 designated as the optical axis of the day path, the day path being constituted by an optical system having an enlargement 1 (no magnification) and comprising prisms or mirrors and provided with at least one second input reflector 9. When the first reflector 4 is in its active position indicated by dot-and-dash lines in FIG. 1, the input light beams are directed after reflection along an optical axis 11 designated as the optical axis of the night path, along which extend an objective 12, a light intensifier tube 13 and a bent ocular 14, which is preferably a binocular. The optical axis 7 and 11 extend in the same plane parallel to a longitudinal axis 15 of the armoured vehicle, this plane being in the present case that of FIG. 1. The first input reflector 4 and the second output reflector 9 comprise first and second alternate concealing means, respectively, which can be controlled by manipulation of the second output reflector 9, of which an embodiment is described below with reference to FIGS. 2 and 3. These alternate concealing means are designed so that, when any one of the first input reflectors and the second output reflector are in the active position, the other is in the concealed position. For viewing by day, the second output reflector 9 occupies its active position indicated by full lines behind the bent ocular 14 of the night path and the first input reflector 4 occupies its concealed position, for example as indicated by full lines beside the objective 12. For viewing by night, the second output reflector 9 is situated in its concealed position as indicated by dot-and-dash lines in FIG. 1 and the first input reflector 4 occupies the active position indicated by dot-and-dash lines before the second input reflector 5. For the passage from the day position to the night position or conversely, the movement itself of the second output reflector 9 initiates the movement of the first input reflector 4 from one to the other of its two stable positions.

The housing of the viewing apparatus is slipped through an opening 16 of the armouring 2 and a tight joint 17 disposed between a shoulder of the housing and the armouring permits of making the assembly hermetic. The manner of fixing the apparatus of conventional type is not described and not shown.

The optical system of the day path shown in FIG. 1 is constituted by three prisms, i.e. the in-put prism 5 already described, an intermediate prism 18 in the form of a parallelepiped and an output prism constituting the second output reflector 9, which may be a total-reflection prism, but whose reflecting surface 19 is preferably semi-transparent. Preferably, the prism 9 is prolonged in the direction of the prism 18 by a prism 21 in the form of a parallelepiped, to which it is glued. The refractive index of the glass used for the prisms 5, 18, 21 and 9 is high, i.e. of the order of 1.6, which for a given section available for the day path through the opening 16 permits of obtaining a large field.

The objective 12 of the night path is inscribed in a cylinder, whose diameter is smaller than that of the light intensifier tube 13. This measure permits of making the apparatus more compact in that the optical axes of the day path 7 and of the night path 11 are inclined with respect to each other at a small angle. In the Figures, this angle A lies between 10° and 20°.

Figure 3A:
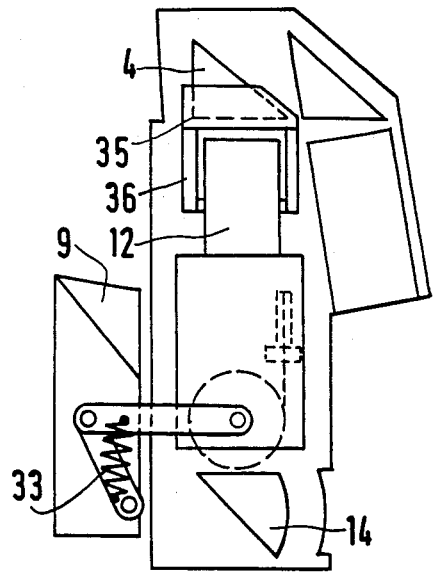
Figure 3B:
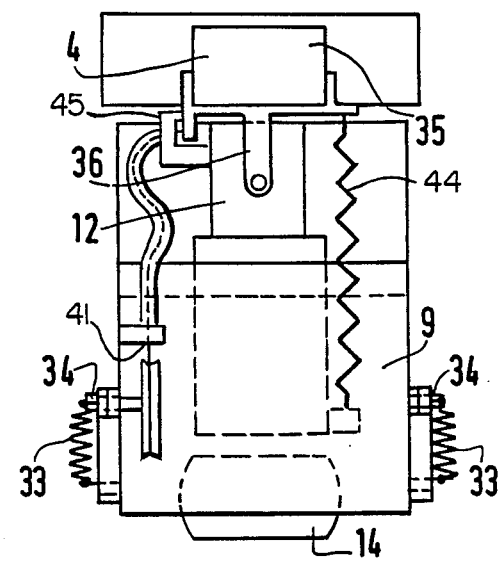

When the viewing apparatus is in the night position, as described below with reference to FIGS. 3a and 3b, the assembly constituted by the prisms 9 and 21 is concealed and the space around the bent ocular 14 is left free in order to permit viewing through this ocular. It would then be possible that the light originating from the interior of the armoured vehicle and more particularly the light emitted by the light intensifier tube 13 and reflected by the observer's face traverses the prisms 18 and 5 of the day path from the interior to the exterior. Even if this reflected light beam is small, it may be sufficient to indicate the presence of the armoured vehicle to a hostile observer in the proximity of the armoured vehicle. For this reason, it is preferably ensured that an obturator of the day path is automatically made operative during the passage from viewing by day to viewing by night. In the embodiment shown in FIG. 1, this obturation is effected by means of an obturator shutter 22 hinged about a shaft 23 integral with the housing 1. In the night position inverse to that shown in FIG. 1, the shutter 22 is pulled by a spring 24 against the inner surface of the intermediate prism 18 and into the path of the light beam parallel to the optical axis 7 of the day path. During the passage to the day viewing position, it is necessary to raise the obturator shutter 22 before the second output reflector 9, 21 is arranged in its active position as shown in FIG. 1. The shutter 22 is then closed again on the assembly of prisms 9, 21 under the influence of the spring 24, thus contributing to its stability.

Preferably, the assembly of the optical elements 4, 12, 13 and 14 constituting the night path is rotatably mounted in the housing 1. By means of bearings of a known type not shown, which are situated at the area of the light intensifier tube 13, it is ensured that the assembly rotates by a few tens of degrees in one or the other direction of rotation about the optical axis 11 of the night path, which in the present case is vertical, on either side of a medium front position. For this purpose, an orientation lever in the bearing position 25 is provided, which is shown in sectional view in FIG. 1. This lever, which can be folded under the bent binocular 14 by means of a hinge not shown, permits orienting in the bearing position the night path, for example by ±25° in jumps of 5°, and is held in position by a ball construction known per se. It can be ensured that the folded position of the lever 25 in the day mode makes the day path immovable in the night position as shown in FIG. 1. According to a variation, the night path may be set into rotation by an electric motor and its rotary movement may be controlled by the movements of the fly-wheel of the vehicle of the movements of the observer's head. The night path, which, for example, has an instantaneous vertical field of 40° and an instantaneous horizontal field of 50°, thus has its overall horizontal field increased to 100° due to the rotation of the night path, the enlargement of the night path lying between 0.9 and 1.

The design of the viewing apparatus described above permits of visualizing driving orders by means of a single device 26 common to the day path and the night path, the observer in the present case being the pilot of the armoured vehicle. Device 26 is integral with the binocular of the night path and is constituted by an assembly of light-emitting diodes, preferably red-emitting diodes, defining the symbols of driving orders, such as arrows of different directions, this assembly being situated in a plane conjugate with the focal plane of the ocular. The injection into the field of the ocular of the light symbols is obtained by means of a prism having seven surfaces 27 provided with a lens glued to the surface 28 of the return prism of the ocular, which in the present case is semi-reflecting. The prism 27 is preferably a Porro half-prism of the second order, which permits of folding it along one side of the device 26. The symbols are thus collimated, for example at 2 meters for the night path. Information is made visible also for viewing by day due to the fact that the second output reflector 9 is arranged in the active position exactly behind the bent ocular 14 by means of a prism 29 having the height of the eye lens of the binocular glued to the surface 19 (which in this case is semi-reflecting) of the prism 9, in order to form a plate having parallel surfaces. The surface 30 of the prism 29 is preferably a spherical correcting diopter of small curvature, which collimates the symbols in the infinite. Thus, it is possible both by night and by day to visualize the driving orders given by the car driver superimposed on the landscape, but without occultation of the latter, in the effective period on the assumption that the armoured vehicle is a tank. These driving orders are preferably visible towards the lower part of the field in order to liberate the main axis for viewing, i.e. at a distance of two meters by night and at an infinite distance by day.

Figure 2A:
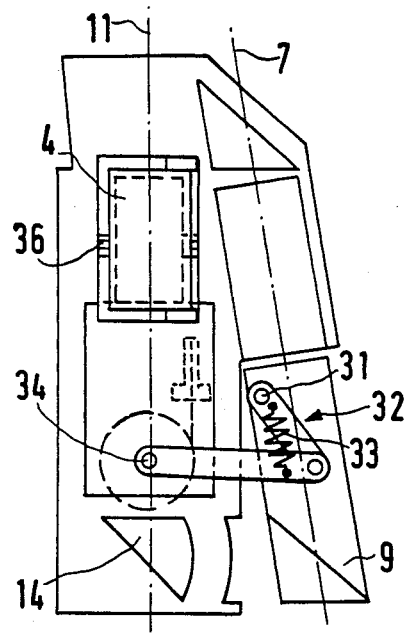
Figure 2B:
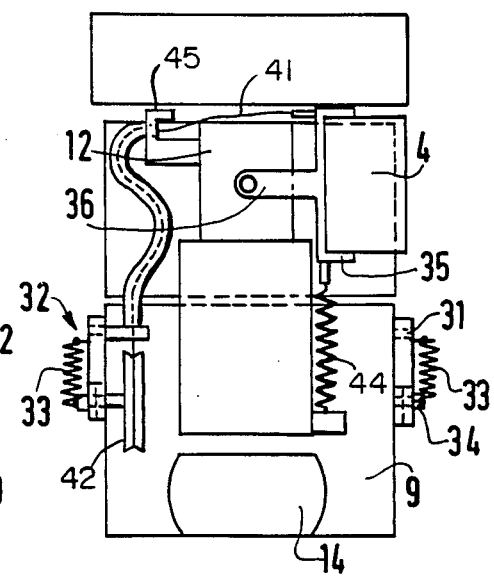

In FIGS. 2a and 2b, the apparatus is shown in the viewing position by day, in which the second output reflector (prism 9) is in the active position and the first input reflector (prism 4) is in the concealed position. These Figures also show the second means for concealing the second output reflector, which is supported for rotation about an axis 31 perpendicular to the plane defined by the optical axes 7 and 11 by lateral rods 32 at one end of the latter. The rods 32 are constituted each by two segments which are hinged with respect to each other for rotation and which are subjected to a permanent return force exerted by a return spring having two equilibrium positions and acting as a tensile spring, which is symbolically indicated at 33, which causes the rods to become extensible. Thus, for the rods 32 two equilibrium positions are obtained, i.e. one folded position shown in FIGS. 2 and 3 and an extended position not shown, which permits the passage of the prism 9 under the binocular 14. The other end of the rods 32 is supported for rotation in the housing 1 by means of journalling means 34, whose axis is parallel to the axis 31. In order to pass to the viewing position by night, the observer manually exerts a longitudinal traction movement in the backward direction on the prism 9 and then a rotary movement of about 180° under the binocular 14, which causes the prism 9 to pass to its concealed position for viewing by night shown in FIG. 3a. This movement makes operative first means for concealing the prism 4 (not shown) so that the latter is caused to pass from its concealed position to its active position shown in FIGS. 3a and 3b according to rotary movement of 90° in a plane perpendicular to the plane of the optical axes 7 and 11, the prism 4 being mounted on a support 35 hinged by means of arms 36 on the objective 12 of the night path. The first means are constituted, for example, by a shattered cable 41 driven by a wheel 42 integral with the shaft 34, one end of this cable being connected to the support 35. When the cable is wound around the wheel, the prism 4 is caused to move against the action of a return spring 44 to its active position, which is obtained when the prism 4 bears on a blocking abutment 45 in the active position. The inverse movement for the passage to the concealed position of the prism 4 is obtained by winding the cable 41 off the wheel 42 and by a concomitant action of the return spring 44. For the passage of the viewing position by day, all the movements described above for the prism 9 and 4 are inverted. Preferably, the movement of the prism 9 also controls by action on electric microcontacts the ignition and the extinction, respectively, of the light intensifier tube.

What is claimed is:

1. A combined night/day viewing apparatus for driving a vehicle and contained in a single housing comprising a night path constituted by a first input reflector, an objective, a light intensifier tube, and a bent ocular, said first input reflector being movable between an active position and a concealed position, in said active position causing light beams originating from the field of view to deviate in the direction of the optical axis of the night path, first concealing means for moving said first input reflector from said active position to said concealed position, in said concealed position being out of the path of said light beams, a day path constituted by an optical system having an enlargement 1 and comprising a second input reflector and a second output reflector, said second input reflector being situated behind the active position of the first input reflector and causing said light beams to deviate in the direction of the optical axis of the day path when said first input reflector is in the concealed position, the optical axes of the day path and the night path being coplanar, said second output reflector being movable between an active position and a concealed position, in said active position being situated behind said bent ocular, second concealing means for moving said second output reflector from said active position to said concealed position, said second concealing means being linked with said first concealing means so that the first input reflector and the second output reflector are concealable alternately by manipulation of the second output reflector.

2. A combined night/day viewing apparatus as claimed in claim 1 wherein said optical axes of the night path and of the day path are inclined with respect to each other upwards at a small angle.

3. A combined night/day viewing apparatus as claimed in claim 1 wherein said second concealing means consist of lateral rods hinged and extensible by means of springs which hold the second output reflector against the viewing apparatus behind the ocular in the active position and before the ocular in the concealed position, respectively, the passage from one to the other of these two stable positions being effected by a longitudinal traction movement and then a rotary movement of about 180° under the ocular.

4. A combined night/day viewing apparatus as claimed in claim 1 wherein it comprises automatic obturation means of the day path consisting of a tight shutter hinged on the said housing and pulled by a spring out of the path of the light beams when the said second output reflector is in the active position and at right angles to the said optical axis of the day path into the path of the light beam when the second output reflector is in the concealed position.

5. A combined night/day viewing apparatus as claimed in any one of claims 1, 2, 3, or 4 wherein said reflectors are constituted by prisms of triangular cross-section and in that the part of the said optical system extending along the optical axis of the day path is constituted by a prism in the form of a parallelepiped.

6. A combined night/day viewing apparatus, as claimed in any one of claims 1, 2, 3 or 4 wherein the night path can be maneuvered by a rotary movement about its vertical optical axis limited to a few tens of degrees on either side of a medium front position and for this purpose it is rotatably mounted in the body and comprises a maneuvering lever.

7. A combined night/day viewing apparatus as claimed in any one of claims 1, 2, 3, or 4 wherein said bent ocular and the second output reflector each comprise a prism having a semi-reflecting surface and said apparatus further comprises a device for visualizing orders for driving the armoured vehicle integral with the bent ocular common to the day and night paths constituted by an assembly of light-emitting diodes defining the symbols of driving orders, the assembly being situated in a plane conjugate with the focal plane of the ocular, the injection into the field of the ocular being realized by means of a prism glued to the semi-reflecting surface of the return prism of the ocular and by means of a prism of triangular cross-section glued to the semi-reflecting surface of the prism constituting the second output reflector.

8. A combined night/day viewing apparatus as claimed in any one of claims 1, 2, 3, or 4 it is an episcope having a large horizontal field intended for driving a tank, for which episcope the vision is binocular both by day and by night.

* * * * *